United States Patent [19]

Rinehart

[11] Patent Number: 5,116,415

[45] Date of Patent: May 26, 1992

[54] METAL VALUE RECOVERY OR REMOVAL FROM AQUEOUS MEDIA

[75] Inventor: Robert W. Rinehart, Arvada, Colo.

[73] Assignee: AQS, Inc., Englewood, Colo.

[21] Appl. No.: 588,134

[22] Filed: Sep. 25, 1990

Related U.S. Application Data

[63] Continuation-in-part of Ser. No. 411,816, Sep. 25, 1989, abandoned, and a continuation-in-part of Ser. No. 411,999, Sep. 25, 1989, abandoned, and a continuation-in-part of Ser. No. 411,876, Sep. 25, 1989, abandoned, and a continuation-in-part of Ser. No. 411,877, Sep. 25, 1989, abandoned.

[51] Int. Cl.$^5$ .............................. B01D 15/00
[52] U.S. Cl. ......................... 75/711; 423/25
[58] Field of Search .................... 75/711; 423/25

[56] References Cited

U.S. PATENT DOCUMENTS

| | | | |
|---|---|---|---|
| 3,565,608 | 2/1971 | Anspon | 423/25 |
| 3,736,126 | 5/1973 | Fritz | 423/25 |
| 3,931,123 | 1/1976 | Vacik et al. | 260/80.73 |
| 3,935,098 | 1/1976 | Oda | 423/25 |
| 3,947,354 | 3/1976 | Swanson et al. | 210/53 |
| 3,969,244 | 7/1976 | Kobayashi et al. | 210/38 |
| 4,058,491 | 11/1977 | Steckler | 260/2.2 R |
| 4,060,678 | 11/1977 | Steckler | 526/260 |
| 4,071,508 | 1/1978 | Steckler | 260/79.3 MV |
| 4,083,783 | 4/1978 | Wing et al. | 210/54 |
| 4,115,260 | 9/1978 | Avery | 210/34 |
| 4,163,092 | 7/1979 | Steckler | 526/292 |
| 4,203,952 | 5/1980 | Hancock | 423/25 |
| 4,207,184 | 6/1980 | Kaiser et al. | 210/37 R |
| 4,379,763 | 4/1983 | Clemens et al. | 252/628 |
| 4,619,744 | 10/1986 | Horton | 204/105 R |
| 4,732,609 | 3/1988 | Frey et al. | 75/117 |
| 4,762,556 | 8/1988 | Hodgkin et al. | 75/118 R |
| 4,876,036 | 10/1989 | Candau et al. | 252/637 |

Primary Examiner—Peter D. Rosenberg
Attorney, Agent, or Firm—Ralph F. Crandell

[57] ABSTRACT

Hydrophilic hydrogels capable of a high degree of water imbibition are contacted with aqueous feedstocks containing metal and metal anion values to collect the water and dissolved or suspended values or materials. The term metals includes the free base and precious metals, alloys, salts (including their solvated and complex precious metal ions) and compounds, including base metal anions, and mixtures of the above which are soluble or insoluble in water. The feeds can be ores, industrial or other wastes. After contact, the hydrated hydrogel can be partially dehydrated and separated from the aqueous feedstock. The material values can be recovered by using a strong oxidant to destroy the hydrogel. The aqueous feedstock can be recycled or further purified.

35 Claims, No Drawings

METAL VALUE RECOVERY OR REMOVAL FROM AQUEOUS MEDIA

CROSS REFERENCE TO RELATED APPLICATIONS

This application is a continuation-in co-pending applications Ser. No. 07/411,816 filed Sep. 25, 1989 and now abandoned; Ser. No. 07/411,999 filed Sep. 25, 1989 and now abandoned; Ser. No. 7/411,876 filed Sep. 25, 1989 and now abandoned; Ser. No. 07/411,876 filed Sep. 25, 1989 and now abandoned; Ser. No. 07/411,877 filed Sep. 25, 1989 and now abandoned.

BACKGROUND OF THE INVENTION

1. Field Of The Invention

The present invention relates primarily to processes for the recovery or removal of metal values from aqueous media. The present invention further relates to environmental clean-up while the process finds particular but not necessarily exclusive utility in the recovery of metal values from aqueous media, it is useful as well for the removal of contaminants from soil and the like and for the removal of metal values or other contaminants from water.

2. Description Of The Prior Art

Fathi, Habashi, "Principles of Extracting Metallurgy". Vol. 2. "Hydrometallurgy". Gordon & Breach Science Publishers, 1970, review some of the hydrometallurgy art relating to the processes of this invention Chapters 1, 2 and 15. Hydrometallurgy includes a variety of unit processes useful in the recovery of metals from ores. Flotation and ion flotation utilize a surface active agent and a gas to separate free metal, ions and/or metal compounds from gangue. The surface active agent adheres to at least one of the solid particles in a slurry and to rising air bubbles thereby lifting the adhered metal, ion, metal compounds, or gangue particles to the surface. Thus, flotation is utilized in the recovery of metal by collecting particles ranging from ions to suspended free metal particles. A sequence of extractive steps using different surfactive agents can separate out a series of metals or ions.

Surface active agents can range from detergent ions, e.g., sodium lauryl sulfonate, to polymers having molecular weights in the millions, e.g., polymeric sulfonates. The specific surface active agent(s), process steps and conditions depend, among other things, on the "water" or "oil" wetting character of the ion(s), metal(s), metal compound(s), gangue, etc. Many of the physical and chemical mechanisms used in flotation are also operative in collecting metals, etc. using flocculation. Many flocculating agents are high molecular weight polymers, such as polyacrylic acids and/or polyacrylamides. (See R. L. Davidson, "Handbook of Water-Soluble Gums and Resins". McGraw-Hill Book Co. 1980, Chapters 16 and 170.) The materials flocculated range from suspensions or solutions of charged solutes to free metal particles. To accomplish these results, specific surface active agents are utilized with particular metals, etc. under specific process conditions.

In leaching, a solvent is used to solubilize and extract a soluble constituent from an ore, ore concentrate, industrial waste, etc. The processes can be simple or more complex. In a simple process, an ore body may be shattered and leached in place or comminuted ore may be piled on a paid or dumped into a tank prior to leaching. Gold and other precious metal particles are sometimes entrained in the leaching step and provide a mixed recovery of metal ions and metal particles. The more rigorous leaching processes use concentrated solvent, high temperatures, high aerobic or anaerobic gas pressure, etc., and can be dangerous. Some of the processes are also multistep and require a series of treatments.

The physical and chemical forces actuating the summarized collection procedures vary with the specific collection system. They may include one or more of hydrogen and/or covalent bonding, electrostatic forces, molecular sieving, van der Waal's forces, etc. Collection by ion exchange, however, is usually based on only a chemical exchange.

Ion exchange resins are always relatively rigid due to a high degree of crosslinking and the attachment of the ionic substituents to, e.g., a styrene backbone. Because of this rigidity, there is much less ion exchange capacity and hydration of the fixed ions within the resins. The resins are typically manufactured so that they can only imbibe from about 23% to about 264% water. Sometimes, special steps can be taken to increase the internal porosity of the particles in order to fully use the fixed active ion capacity. The rigidity created by the increased crosslinking is, however, a benefit because the ion exchange resins must be resistant to degration resulting from handling, movement within the bed or column and osmotic shock. Ion exchange resins sometimes are said to be in the "gel" form, although the "gels" are significantly different in their physical and chemical properties than those of the hydrogels.

Hydrated hydrogels are quite flexible polyelectrolytes which are not based on a styrene or similarly rigid backbone polymer like the resins and have a much greater number of available fixed ions. They can take up enormous volumes of water, e.g., up to 1200 times their weight, but are more easily degraded physically.

Both the resins and hydrogels have many uses. While the primary use of ion exchange resins is in water softening and other chemical processing (including metal purification), hydrogels are used in many fields ranging from contact lens eye glasses to agricultural additives. In special forms they have even been generally taught to be useful in metal recovery. See Robert Steckler, U.S. Pat. Nos. 4,036,778; 4,058,491; 4,060,678; 4,071,508 and 4,163,092. These patents teach complex copolymer combinations of polyacrylates, polyamides and other polymers which have moieties enabling them to be strong or weak acid or strong or weak base complexers or reactors with metals, and a variety of other materials. These hydrogels only take up to about 100% water, by weight. Effectively, Steckler teaches ion exchangers.

U.S. Pat. No. 4,402,725 issued to H. Heller et al teaches the embedding of ion exchangers into hydrogels to create fertilizers and the additional of a coated magnesium sulfate material to the mixture.

Japanese Patent 80/127,143 issued to Japan Kokai Tokkyo Koho (Chem. Abst. 94(16) 126155b) teaches the use of another complex hydrogel product to adsorb uranium from sea water. The hydrogel product was obtained by reacting titanium chloride with polyacrylic acid hydrazide (PAH). PAH is also used as a binder for an activated carbon-titanium oxide composite adsorbent to extract uranium from sea water. See, for example, S. Katoh, et al. Shikoku Kogyo Gijutsu over Shikensho Hokoku 19(2) 62–6, 1989 (Chem. Abst 109[6]41252W). After reviewing this art, one would not expect that these complex material could be substituted by a simpler hydrogel.

OBJECTS OF THE INVENTION

The summarized art indicates that the mining industry is seeking ever better and, preferably, simpler, mechanisms for the recovery of metals. It also indicates that the search is worldwide with simple answers slow in coming. The unit process of this invention is quite simple and can be used at a variety of stages in the recovery of a variety of metals in hydrometallurgical metal recovery processes. One would not expect to find that the simpler hydrogels provide the breadth of results achieved through electrostatic effects, van der Waals effect, hydrogen bonding, etc. as utilized in filtration, flocculation and flotation systems to recover metals.

The process of this invention results from winnowing out many and combining some of the teachings of summarized art. Thus, hydrogels used in this invention are, in a sense, substituted for the surface active agents in the flotation and flocculation processes, the resins in some ion exchanges processes, the leachment of some leaching processes, and the filtration beds of still other leaching processes. In doing so, a simple but effective process is created.

Accordingly, the principal object of the present invention is to provide an improved process for the removal or recovery of metal values from aqueous media. Another object of the present invention is to provide an improved process for the removal of values and contaminants from water such as ground water, surface water and the like.

A further object of the present invention is to provide a process for the collection and concentration of metal values from water slurries of ores.

Still a further object of the present invention is to provide a process of the foregoing character which is suitable for recovering a wide variety of metals including base metals, precious metals, base metal anions and the like from aqueous media.

SUMMARY OF THE INVENTION

Aqueous feedstock containing base metals, base metal anions or precious metals are contacted with one or more hydrophilic hydrogels to separate the metal values from the aqueous feedstocks. The aqueous feedstocks can include other polar solvents, surface-active agents, etc. Polar solvents include other polar liquids. The term "precious metals" includes free metals, alloys, salts (including their solvated and complex ions) and metal compounds and mixtures thereof which are soluble or insoluble in the aqueous feedstock. The term "base metals" includes free metals, alloys, salts and metal compounds and mixtures thereof which are insoluble in the aqueous feedstock and their solvated and complex cations. Preferably, the base metals are amphoteric metals. The ions recoverable by this process are the water soluble, base metal anions of strong acids and alkali metal, including ammonium, salts and water soluble complexes. The hydrogels have substantial water imbibition capability. After contact, the hydrated hydrogel is separated from the water and the metal value is recovered from the hydrogel. The water can be recycled or further purified as needed.

The simpler hydrogels used in the process of this invention are much more versatile than the ion exchange resins, more complex hydrogels of the prior art, even though some of the same or similar monomers, crosslinkers, etc. are used in their manufacture. Thus, the Amberlite (Rohm & Haas) weak acid ion exchange resins and the Alcosorb (Allied Colloid, Inc.) hydrogel soil additives which are used in the processes of this invention both utilize carboxylic acid moieties. Amberlite 50/75 is used, for example, in Ni and Cu ion recovery where the resin bed is repeatedly regenerated. Amberlite 84 is similarly used to separate alkaline salts of mono and polyvalent cations in water treatment operations. The soil additives would not be useful in commercial ion exchange processes and are mixed with earth to soak up rain or other moisture and slowly release it to the drying soil.

DESCRIPTION OF THE INVENTION

The hydrogels useful in this invention are hydrophilic, are capable of a high degree of water imbibition, collect previous metals, and are substantially inert to the feedstock except with respect to movement of the metals into and within the "sphere of influence" of the hydrating and/or hydrated hydrogel. The sphere of influence is the spatial volume surrounding the hydrogel particles in which those forces normally operative in metal collection by flotation, flocculation, ion exchange and filtration art.

The useful hydrogels are capable of imbibing amounts of water in the range of slightly less than 5 to greater than 1,000 gms of water/gm of hydrogel. Preferably the hydrogel is less than fully hydrated, more preferably, the hydrogel is substantially dehydrated and, most preferably, the hydrogel is dehydrated at the time of contact with the metal and can imbibe at least 50 gms of water/gm of hydrogel; and more preferably at least about 100 gms of water/gm of hydrogel.

The desired degree of water imbibition is a function, primarily of the degree of crosslinking between polymer chains. The amount of crosslinking agent should be equal to no more than about 10% of the total polymer weight and preferably no greater than 0.1% of the polymer weight. The crosslinking agents used are organic and preferably provide a substantial distance between like polymer chains. The crosslinker can be any standard crosslinker, e.g., ethylene glycol, dimethacrylate; 3-oxapentamethylene dimethacrylate; 3.6.9-trioxundecamethylene; hexamethylene bis(methylacyloxyethylene) carbonate; 2-hydroxytrimethylene dimethacrylate; 2.3-hihydroxytetramethylene dimethylacrylate; and methylene bis acrylamide. Preferably, the crosslinker is methylene bis acrylamide.

The useful hydrogels are hydrophilic, cationic, anionic, or nonionic polyelectrolytes. These hydrogels are made up from the natural, substantially linear, water-soluble monomers or polymers of commerce or synthetic monomers or polymers with similar characteristics. The hydrogels can contain homopolymers, graft polymers, copolymers and mixtures of polymers. These polymers can also be derivztized in various ways. Thus, using algin as an example, the polymers can be algins, algenic strong acid salts, and lower alkoxy lower alkyl alginates.

The hydrogels are manufactured by crosslinking starch and grafted starch polymer, algenic acid and algenate, natural gums, lower alkyl cellulose, hydroxyalkyl cellulose, carboxyalkyl cellulose, vinyl pyrrolidone, hydroxyalkyl ethyleneoxide, saccharides, xanthans, vinyl alcohol, ethylene oxide, sulfomethylamide, peptides, ethylene carbonate, procollagen, acrylic acid, acrylate, acrylamide, and mixtures of these monomers and polymers.

Typical hydrogels include starch and grafted starch hydrogels, linear algenate hydrogels, linear algenic acids hydrogels, natural gum hydrogels, such as those including guar gum and carrageenin; lower alkyl, carboxy alkyl, and hydroxy alkyl cellulose hydrogels; polyvinyl pyrrolidone hydrogels; polyhydroxyalkyl (ethleneoxide) hydrogels; the polysaccharide hydrogels, elg., those made from xanthans; dextrans; dextrins; polyacrylamides hydrogels; and partially hydrolyzed polyacrylamide hydrogels; carboxy lower alkyl cellulose hydrogels; polyhydroxy lower alkyl cellulose hydrogels; polyethylene glycol hydrogels; polyethylene oxide hydrogels; polyvinyl alcohol hydrogels; etc. and mixtures of these hydrogels. Not all hydrogels work equally well with all metals or under all contact conditions. The same is true of batches of commercial hydrogels.

The preferred hydrogels incorporate (a) at least one of the various types of copolymers made up of acrylamide and alkali metal salts and lower alkyl esters of acrylic and butenic acids and (b) at least one of the polymers made up of acrylamide, acrylic acid, and any butenic acids and the alkali metal acrylates and butenates. The term "alkali metal" is intended to include the normal alkali metal and ammonium ions. The term "lower alkyl" is intended to include only those moieties have 1-7 carbon atoms which do not substantially sterically interfere with the collection of metals, metal ions and compounds. Unexpectedly, these hydrogels and mixtures of hydrogels collect cations, anions and materials with little or no charge.

The preferred hydrogels are made up of acrylamide and alkali metal acrylates. The preferred acrylamide polymer is a partially hydrolyzed acrylamide. Preferred formulations are hydrogels utilized by Allied Colloids, Inc., American Cyanamid Co. and Stockhausen, Inc. in their catamenial, diaper, and agricultural applications. All three are thought to utilize formulations made up of acrylamide and alkali metal acrylate (sodium, potassium and ammonium) crosslinked with methylene bis acrylamide. Stockhausen, Inc. and Allied Colloids, Inc. are thought to use 100% polyacrylic acid in some of their formulations. Generally, the preferred compositions contain 20 to 50% acrylate and 50-80% acrylamide moieties.

An illustrative hydrogel finding particular utility in the present invention comprises a polyacrylamide/polyacrylate copolymer crosslinked to produce a hydrogel. An illustrative polymer comprises a copolymer containing about 40% by weight sodium or potassium acrylate and about 60% acrylamide crosslinked with methylene bis acrylamide or a related derivative in an amount sufficient to produce a swelling faction of 300–400 in distilled water. The crosslinked copolymer is crushed to a dry particle size of about $2 \times 2 \times 2$ mm with a maximum of 3–5 mm in one direction. One such copolymer is the American Cyanamid Polymer "AQUASTORE", which polymer is ground to the above particle size, screened and dried to a water content of less than 13.3% water.

An alternative illustrative copolymer is a copolymer of sodium or potassium acrylate in the amount of about 36% by weight and acrylamide in the amount of about 64% by weight crosslinked with methylene bis acrylamide or a related derivative sufficient to produce a swelling factor of 300-400 in distilled water. The polymer is dried to 8.2–8.5% water. One such polymer is sold by Allied Chemical under the name ALCOSORB AB3C.

Another illustraive hydrogel is produced by Stockhausen, Inc. as "FAVOR SAB922". This hydrogel is a 100% sodium acrylate crosslinked with methylene bis acrylamide to a level of crosslinking such that the polymers swells 200–300 in distilled water. Another polymer produced by Stockhausen, Inc. under the trademark FAVOR SAB800 consists of a 100% sodium acrylate polymer crosslinked with methylene bis acrylamide and polyvinyl alcohol to produce a swell ratio or factor of 100–200 in distilled water.

The hydrogel particles should be substantially larger than the average cross-section of particles in the feedstock for ease of separation from residual inert materials. Where a slurry is being treated, the hydrogel can be introduced to the feed as dry particles. When some dry hydrogel particles are too small, e.g., 0.5-1 mm on a side, they tend to weakly agglomerate and are more difficult to handle. Preferably, the dry particles are at least $2 \times 2 \times 2$ mm and more preferably are about 3-5 mm in one dimension. Further, it is preferred that they hydrating or hydrated hydrogel particles do not adhere to one another or to the equipment and have substantial structural integrity.

The precious metals include the precious metal elements, their alloys and mixtures. The metals include gold, silver, platinum, palladium, iridium, osmium, rhodium and ruthenium. The term "salts" is intended to include soluble salts (including their solvated simple and complex ions) and insoluble salts and esters of the metals and the term "compounds" is intended to include the soluble and insoluble oxides, and combinations of metals and nonmetals, e.g., gold telluride and silver arsenide.

Metals, salts and compounds are preferably soluble, or at least partially soluble, in the aqueous feedstocks. However, suspended or colloidal free metal can also be collected. Insoluble and soluble metal salts or compounds, as indicated in a CRC "Handbook of Chemistry and Physics"; see, for example, the 60th Edition, Section B; can also be recovered. Typical precious metal simple and/or complex ions are silvernitratoplatinite, diaminesilver perrhenate, platinum monohydroxy chloric acid, tetromine platinum (II), chloride hydrate, nitratopentamine iridium nitrate, auric chloride and silver nitrate, zinc tetramineperrhenate.

The collectible metals making up the ions, salts and/or compounds are those which form "weak" bases in the aqueous feedstock. Thus, the term does not include the alkali metals. The free metals, ions and compounds or insoluble salts to be treated include ores, industrial wastes and concentrates obtained via water purification or ore processing. For example, the feed metals can be from the mining of free metals, metal salts or metal compounds; from jewelry manufacture; plating solutions; photographic film manufacture and processing; and from heavy metal contaminant cleanup. Gangue, grinding wheel particles, entrained free metal particles, etc. can also be present in the aqueous feedstock at the time of hydrogel treatment.

The base metals include, for example, strontium, titanium, cobalt, cadmium, lead, europium, and tungsten. The compounds are made up of the base metals and non-metals, e.g., oxygen, sulfur, and selenium, the insoluble salts of a base metal and an anion of a strong acid. The metals do not include the alkali metals, e.g., sodium and potassium, or precious metals, e.g., gold, silver or the platinum group metals. Preferably, the metals do not include the alkaline earth metals.

The cations are derived from salts and compounds which are preferably soluble, or at least partially soluble, in the aqueous feedstocks. However, suspended or colloidal free metal can also be collected. Insoluble metal salts or compounds, as indicated in a CRC "Handbook of Chemistry and Physics"; see, for example, the 60th Edition, Section B; can also be recovered. The collectible metals making up the ions, salts and/or compounds are those which form "weak" bases in the aqueous feedstock. The free metals, salts, ions and compounds to be treated include ores, industrial wastes and concentrates obtained via water purification or ore processing. For example, the feed metals can be from the mining of free metals, metal salts or metal compounds; from metal manufacturing processes, plating solution; and from heavy metal contaminant cleanup. Gangue, grinding wheel particles, entrained free metal particles, etc. can also be present in the aqueous feedstock at the time of hydrogel treatment.

The collectible base metals are the free base metals, their alloys and mixtures; the water insoluble salts and compounds containing base metals and the solvates simple and complex cations of base metals. Preferably, the collectible base metals are amphoteric metals. Typical soluble salts from which the soluble base metal cations are derived include potassium uranyl sulfate, zinc tetra pyridine fluoro silicate, basic lead chromate and lead ferrocyanide.

The recoverable base metal anions are the base anions of strong acids and water soluble alkali metal, including ammonium, salts and complexes. Preferably, the materials from which the base metal anions are solvated are at least slightly soluble in cold water. Typical salts from which the base metal anions are derived include the fluoantimonite, fluotitanate, the fluogermanate of ammonia; the metavanadate of potassium, and the cobaltinitrite, cyanocuprate, ferrate, metagermanate heptahydrate, iron oxalate, molybdate, tungstate, and silicotungstate dodecahydrate of sodium. The base metal anion feed can result from refining, free metals, metal salts or metal compounds; from manufacturing processes, plating solutions; and from heavy metal contaminant clean-up. Gangue and other impurities can also be present in the aqueous feedstock at the time of hydrogel treatment. Preferably, however, the inerts have been removed.

The water component of a feedstock can be alkaline or acidic and can change or be changed during the process, and can contain surfactants or other processing aids. Preferably, it should not have a pH at the isoelectric point of the hydrogel. The feedstock water can also contain other polar solvents such as low molecular weight alcohols, ketones and esters. The presence of such solvents reduces the rate of water imbibition, however.

The feed should not include constituents which are seriously detrimental to the physical integrity or reactivity of the hydrogels during the treatment period. This absence of detrimental system constituents is particularly necessary where the ore is leached in place or in a pile requiring the hydrogel to remain in place for substantial amounts of time. Preferably, the usual leachate collection systems are in place for these types of recovery operations. The hydrogel can be a part of a filter bed and as such can act as a particle filter and ion collector. Preferably, the solids contact the hydrogel in a countercurrent flow unit where gangue is removed from the bottom and the floating partially or fully hydrated hydrogel and its collected metals are removed from the top by the usual methods. Preferably, the ore or industrial waste particles have been ground to about 200-400 mesh. Preferably, an initial contact is made between the aqueous feedstock and hydrogel and then additional contacts are made until most, if not all, the gangue or other inert particles have been removed, i.e., until the precious metal collection end point is reached.

Strong acids, such as HCl, $H_2SO_4$, e.g., NaCl, can be used to partially dehydrate the hydrogel and/or release the metals from the hydrogels. Strong oxidizers are also useful, e.g., sodium hypochlorite, nitric acid and mixtures of nitric and hydrochloric acids, hydrogen peroxide, and other compounds of similar oxidizing capability. These oxidizers destroy the hydrogel polymer and release the metal(s). The metal reaction products can then, if necessary, be reduced to the free metal. However, the oxidizers used to degrade the hydrogel cannot be too strong, e.g., permanganic acid, or the mixture will explode.

The separated feed water either can be recycled to increase metal recovery or can be further purified by the usual water purification steps, e.g., flocculation and ion exchange.

The process embodying the present invention in its broadest aspects is a separation process for separating particulate and dissolved components from water. The process may be considered a metal or ion concentration process, a contaminant removal process or a water purification process. In each aspect the hydrogel is effective to separate the components of an aqueous solution or suspension.

For concentrating metals a slurry or solution of the metals and metal compounds is formed. This solution or slurry is treated with the polyacrylate hydrogel described above. The expanded hydrogel is separated from the slurry or solution, washed and dried. The water and organic hydrogel is driven off by heating and the metal values collected for further refining. The water may be recycled to the ore slurry, fresh hydrogel particles added to the slurry for a further cycle, and the cycles repeated until essentially all of the metal or metal values are removed from the ore.

For water purification the process is essentially the same, except that the water removed from the solution or slurry is collected and utilized but not recycled to the solution or slurry. The water removed from the hydrogel is essentially pure. The process is thus highly effective for cleaning contaminated water. The amount of hydrogel sufficient to combine with all of the water is utilized. After the hydrogel has expanded the water is driven off by heating and collected for further use while the hydrogel is dried and either reutilized or discarded. In this manner, contaminated water may be readily purified and, ultimately, concentrated metals or other compounds both organic and inorganic may be produced as a byproduct.

The process is also capable of removing a wide variety of free metals, metal compounds and organics present as contaminants in soil. Contaminated soil may be slurried with water and the hydrogel particles added. The water will remove contaminants from the soil and then the water and dissolved or suspended material particles will be picked up in the hydrogel from which they may be removed and recirculated or collected as described above.

In the process of this invention the hydrogel has been observed to pick up both dissolved and particulate materials from an aqueous medium. It has been observed that once the particles or solutes are picked up by the hydrogel they are difficult to remove even with distilled water. In order to recover any desired metal or material values, the hydrogel must be destroyed. In a series of tests, a wide variety of metal including barium, chromium, zinc, cadmium, lead, copper, silver and gold, and their compounds have been collected in the hydrogel and further tests have indicated that organic compounds such as phenol may likewise be effectively separated from water by utilizing the above described hydrogels.

The process is not limited to the above metals and compounds thereof, but may also include such metals as iron, mercury, vanadium, lanthanum, and cerium, and it would be expected most if not all metals and metal values could be separated from aqueous solutions or suspensions thereof.

EXAMPLE 1

This example illustrates the use of the process to recover precious metal values from aqueous media.

A solution made up of silver and nitric acid was added to deionized water to make up 100 ml. of solution containing 2 mg/1 silver. The 100 ml. solution and 0.15 gm American Cyanamid agricultural polyacrylamide/polyacrylate hydrogel particles were placed in a 100 ml polyethylene bottle and agitated by rotating the bottle end over end every five minutes for a one hour test period. The solution had an initial pH of 5.89. The percent water imbibed in the hydrogel was 35.6% and that remaining as free water was 64.4%. The amount of silver remaining in the free water was determined to be 0.11 mg. Thus, 0.19 mg. silver was collected by the hydrogel. Correspondingly, the concentration of the metal in the hydrated hydrogel was 5.34 mg/1 while that in the free water was 1.71 mg/1.

The hydrated hydrogel was separated from the free water by using a 200 mesh stainless steel screen. Once separated, deionized water was added to the hydrated hydrogel to make up 100 ml and the agitation procedure repeated. The pH of the free water at the end of the hour was 6.32 and the weight ration of hydrated hydrogel to dry hydrogel [weight ratio] was 307. Less than 0.001 mg of silver was removed by the deionized water from the hydrated hydrogel.

Examples 2-7 inclusive, while not actually prepared, illustrate potential applications of the process embodying the present invention.

EXAMPLE 2

An ore containing both coarse and fine gold may be filtered through a 100 mesh filter to separate the coarse gold and the fines given a standard cyanide treatment. The resulting solution would be expected to contain 0.10% gold, silver and other metal cyanide ions. This solution would be recirculated through a bed of 20 gms of dry Allied Colloids' Alcosorb hydrogel until the metal recovery end point is reached. On reaching the end point, the hydrated hydrogel would be dried and sequentially treated with NaOCl and HCl to break down the polymer and form a silver chloride precipitate. The remaining gold cyanide solution could be separated and treated with zinc dust to recover the gold.

EXAMPLE 3

Gold, platinum and other precious metal particles, would be treated with a polyethylene oxide based hydrogel in a countercurrent flow column. Water and hydrogel are injected into the column near the bottom and the solids sifted into the top. The rising hydrogel particles would preferentially "float" the metal particles to the surface. The solids are removed form the bottom.

The hydrogel could be recycled until it reaches the maximum practical particle recovery. The hydrogel would then be removed and treated with $H_2O_2$ to destroy the hydrogel and form a metal residue which double leached with aqua regia or other solvent, following which the leachate would be treated with ammonium chloride to form a metal sponge such as a platinum sponge which is calcined to form the pure metal sponge.

EXAMPLE 4

Water from a San Luis Valley, Colorado water well contains gold in soluble form. The gold can be electroplated on a stainless steel scouring pad. Alternatively, a 10 gallon container of the gold containing water could be filtered in a bed of 5 ml of a granular polyvinyl alcohol-based hydrogel. The hydrogel would then be treated with $H_2O_2$ to destroy the hydrogel. The gold thus produced would be treated with aqua regia and precipitated with zinc.

EXAMPLE 5

A mixture of flue dusts from a molybdenum sulfide roasting unit contains $Re_2O_7$. This dust could be leached by the water of a polyacrylic acid based hydrogel bed which immediately ion exchanges with the acid ions. The separated hydrogel would then be oxidized to free rhenium metal.

EXAMPLE 6

Ceragyrite (AgCl) ore may be leached with ammonium hydroxide and the leachate is complexed with granular xanthin based acid hydrogel in a filter bed. The hydrogel could be contracted with a strong salt solution to reduce its hydration. The hydrogel would then be separated and oxidized to free the metal.

EXAMPLE 7

Ore from a laurite, ruthenium sulfide, deposit would be ground to 50 mesh and sifted into the top of a countercurrent extraction column. Water and a polyacrylic acid based hydrogel would be introduced near the bottom of the column. The rising hydrogel, with the collected sulfide would be removed and oxidized to release the laurite particles and the residue roasted in air to recover the ruthenium.

EXAMPLE 8

This example illustrates the use of the process to recover base metal values from aqueous media.

A solution made up with chromium trioxide was added to was added to deionized water to make up 100 ml. of solution containing 5 mg/1 chromium as chromate ion. The solution and 0.15 gm American Cyanamid agricultural polyacrylamide/polyacrylate hydrogel particles were placed in a 100 ml polyethylene bottle and agitated by rotating the bottle end over end every five minutes for a one hour test period. The solution had an initial pH of 6.10. The percent water imbibed in the hydrogel was 38.4% and that remaining as free water was 61.6%. The amount of chromium remaining in the free water was determined to be 0.41 mg. Thus, 0.09 mg. chromium was collected by the hydrogel. Correspondingly, the concentration of the metal in the hydrogel was 2.34 mg/l while that in the free water was 6.63 mg./l.

The hydrated hydrogel was separated from the free water by using a 200 mesh stainless steel screen. Once separated, deionized water was added to the hydrated hydrogel to make up 100 ml and the agitation procedure repeated. The pH of the free water at the end of the hour was 6.10 and the ratio of hydrated hydrogel to dry hydrogel weight ratio was 302. Less than 0.34 mg of chromium was removed from the hydrated hydrogel.

Examples 9 and 10 while not actually prepared, illustrate potential applications of the process embodying the present invention.

EXAMPLE 9

Scheelite ore ($CaWO_4$) may be treated with strong aqueous ammonia and coarse filtered to remove the gangue. HCl would then be added and the solution agitated with polyacrylamide hydrogel. The precipitating orthotungstic acid would be expected to adhere to the hydrogel, residual calcium chloride remaining in the vessel when the floating hydrogel is removed. The hydrogel could be destroyed with $H_2O_2$, allowing the tungstic acid to be recovered.

EXAMPLE 10

Sodium chromate, formed in a sintering roast of chromite with $Na_2CO_3$, could be leached with water and the leachate filtered to remove the insolubles. The leachate would then be treated with methylacrylic acid based hydrogel to recover the chromate from solution. The hydrogel would then be treated with acid to reduce the hydration of the hydrogel and free the chromic acid.

EXAMPLE 11

This example illustrates the use of the process of the present invention to recover a variety of base metal ion values from aqueous media.

To this end, an experiment was run to determine the ability of agricultural additive hydrogel made from acrylamide/acrylate monomers (American Cyanamid) to absorb a variety of metal ions from water. The dry commercial hydrogel was hydrated in the aqueous solutions indicated in Table 1. Phase 1 tested hydration in feed solutions and Phase 2 tested the equilibration of the hydrated hydrogels in deionized water.

One hundred ml of solution and 0.15 gm of copolymer were utilized in each test. The solution and polymer particles were in 100 ml polyethylene bottles and agitation consisted in rotating each bottle end over end every five minutes for a one hour test period.

At the end of the hydration period, the polymer particles were collected on a 200 mesh stainless steel screen held in a plastic support and weighed. Measurements were made resulting in the data of Tables 1 and 2. Table 1 shows the initial concentrations, the pH of the water after separation from the hydrated copolymer and the weight ratio of hydrated copolymer to dry copolymers. Table 2 shows the phase distribution of the water between the hydrated copolymer and the nonhydrated water, the amount of metal in the hydrated copolymer and the nonhydrated water, and the metal concentration in each of the hydrated copolymer and nonhydrated water. The hydrated copolymer particles were then made up to 100 ml with deionized water in the original (cleaned with deionized water and dried) bottles and agitated for one hour as previously described. Measurements were then made resulting in the data of Table 3.

TABLE 1

| Ion Specie | mg/l | Phase 1 | | Phase 2 | |
| --- | --- | --- | --- | --- | --- |
| | | pH | Hydrogel Weight, Hydrated/Dry | pH | Hydrogel Weight, Hydrated/Dry |
| Ba | 20 | 5.51 | 220 | 6.76 | 267 |
| Cd | 2 | 1.88 | 8.4 | 2.85 | 9.2 |
| Cu | 5 | 4.01 | 247 | 6.57 | 282 |
| Pb | 5 | 5.20 | 213 | 6.28 | 295 |
| Zn | 1 | 6.53 | 274 | 6.23 | 328 |

TABLE 2

| Ion Specie | Concentrations | | | | | |
| --- | --- | --- | --- | --- | --- | --- |
| | Water | | mg. solute | | Conc. (mg/l) | |
| | Hydrated Hydrogel | Free Water | Hydrated Hydrogel | Free Water | Hydrated Hydrogel | Free Water |
| Ba | 35.0 | 65.0 | 1.29 | 0.71 | 36.8 | 10.9 |
| Cd | 1.3 | 98.7 | 0.007 | 0.193 | 5.38 | 1.96 |
| Cu | 37.0 | 63.0 | 0.25 | 0.25 | 6.76 | 3.97 |
| Pb | 31.6 | 68.4 | 0.26 | 0.24 | 8.23 | 3.51 |
| Zn | 41.3 | 58.7 | 0.051 | 0.049 | 1.23 | 0.83 |

TABLE 3

| Ion Specie | Concentrations | | | | | |
| --- | --- | --- | --- | --- | --- | --- |
| | Hydrated Hydrogel | Free Water | Hydrated Hydrogel | Free Water | Hydrated Hydrogel | Free Water |
| Ba | 42.4 | 57.6 | 1.285 | 0.005 | 30.3 | 0.09 |
| Cd | 1.4 | 98.6 | 0.004 | 0.003 | 2.86 | 0.03 |
| Cu | 42.3 | 57.7 | 0.234 | 0.016 | 5.53 | 0.28 |
| Pb | 43.8 | 56.2 | 0.248 | 0.012 | 5.66 | 0.21 |
| Zn | 49.4 | 50.6 | 0.0505 | 0.0005 | 1.02 | 0.01 |

The above data show that, under test conditions, the hydrogel hydrated and collected a variety of metal ions from aqueous solution and retained substantial amounts of these ions when the hydrogels were introduced into deionized water.

Examples 12-16, while not actually prepared, illustrate potential applications of the process embodying the present invention.

EXAMPLE 12

Mine tailings containing 0.8% metallic copper could be treated using the standard aqueous ammonia dissolution process. The solution would then be filtered through a column of hydrating granular American Cyanamid Aquastore Soil Water Retention aid, to retain copper ions and residual particles of metallic copper.

EXAMPLE 13

A hexaminecobalt chloride complex salt would be extracted with ammonium hydroxide and the mixture acidified with hydrochloric acid and diluted with water. The water solution would then be recirculated through a filter bed containing a mixture of pyrrolidone hydrogel and polyethylene glycol hydrogel. The cobalt chloride would be collected by the hydrogel and the hydrogel then treated with NaOCl to destroy the polymer and recover the cobalt chloride for further processing.

EXAMPLE 14

Altaite (PbTe) ore could be processed in a countercurrent column to recover the ore PbTe from the gangue. A polyethylene glycol hydrogel would be utilized as the flotation agent, the gangue falling to the bottom of the column.

EXAMPLE 15

A copper sulfide (26%) mineral ore containing 3% zinc could be treated at room temperature by adding bankers' yeast to a leaching tank filled with ore and water. After one day, the liquid phase would be expected to have a pH of about 2 and contain about 9.5 g/l copper and 7 gm/l zinc, thereby reducing the copper concentration of the ore to 22%. After removal of the leachate, the tank would be filled with water and the treatment repeated until the copper in the leachate bath drops substantially. After each treatment, the leachate would be mixed with a bed of acrylamide hydrogel to recover the metals.

EXAMPLE 16

An ammoniacal ammonium carbonate leachate containing 60 mg/l cobalt and 33 g/l ammonia could be neutralized with HCl and filtered through a polyethylene oxide hydrogel bed. The leachate would be recirculated through the filter bed until little or no cobalt values remain. The hydrogel would then be oxidized with $H_2O$ to destroy the hydrogel and recover the cobalt chloride for further processing.

EXAMPLE 17

To further illustrate the effectiveness of the foregoing process, metal values contained in grindings from a jewelry's floor containing precious metals such as gold, silver and platinum were recovered. The grindings were screened through a 10 mesh screen to remove the larger particles. From the fine particles, material was weighed to produce a weight equivalent to an ore containing 7,000 ppb gold and an ore containing 14,000 ppb gold. Such an amount of ore would be equivalent to about ¼-½ oz. per ton. The grindings were placed in a tumbler grinder and water was added in the amount of 250 ml together with sufficient Allied Chemical AL-COSORB to take up all of the water. The mixture was tumbled for 24 hours. It was observed that no free metal remained in the tumbler, all metal having been taken up in the hydrogel.

Particles of the hydrated hydrogel were dried in an oven at 300°-400° F. for 12±/− hours to remove all of the water to a water content of about 13-1/2%. After drying the hydrogel particles were observed at 100× magnification and it was noted that all of the particles were attached to or contain within the hydrogel particles.

While a certain illustrative embodiment of the present invention has been shown in the drawings and described in detail in the specification, it should be understood that there is no intention to limit the invention to the specific form and embodiments disclosed. On the contrary, the intention is to cover all modifications, alternative constructions, equivalents and uses falling within the spirit and scope of the invention as expressed in the appended claims.

I claim:

1. The process of recovering metal values comprising contracting an aqueous feedstock containing water and metal values with a hydrophilic hydrogen having a swelling factor of 100-400 upon absorption of water, and collecting the water and metal values with the hydrogel.

2. The process of recovering metal values as defined in claim 1 wherein the metal collecting hydrogel has substantial water imbibition capacity and is selected from the group of polymers consisting of acrylamide, acrylic acid butenic acids, alkali metal acrylates and alkali metal butenates and copolymers of at least one of each of a) acrylamide and b) alkali metal salts and lower alkyl esters of acrylic and butenic acids.

3. The process of recovering metal values as defined in claim 2 wherein the hydrogel is substantially dehydrated when contacted with the aqueous feedstock.

4. The process of recovering metal values as defined in claim 3 wherein the hydrogel is capable of imbibing at least 5 gms of water/gm of hydrogel.

5. The process of recovering metal values as defined in claim 1 including the step of treating the hydrogel after contact with the aqueous feed stock with a strong oxidizing agent to destroy the hydrogel.

6. The process of recovering metal values as defined in claim 1 wherein the hydrogel comprises a copolymer of acrylamide and an alkali metal acrylate.

7. The process recovering metal values as defined in claim 6 where the polymer is crosslinked with methylene bus acrylamide.

8. The process of recovering metal values as defined in claim 7 wherein the degree of crosslinking in the hydrogel is no greater than 1.0% of the polymer weight.

9. The process of recovering metal values as defined in claim 6 wherein polymers are crosslinked with a crosslinker selected from the group consisting of ethylene glycol dimethacrylate; 3-oxapentamethylene dimethacrylate; 3.6.9-trioxyundecamethylene; hexamethylene bis)methylacyloxy-ethlene) carbonate; 2-hydroxytrimethylene dimethacrylate; 2.3-hydroxytetramethylene dimethylacrylate and methylene bis acrylamide.

10. The process of recovering metal values as defined in claim 1 wherein the aqueous feedstock is separated from the hydrogel and further purified.

11. The process of recovering metal values as defined in claim 1 wherein the hydrogel particles have dimensions of at least $2 \times 2 \times 2$ mm when dehydrated and crushed.

12. The process of recovering metal values as defined in claim 1 wherein the hydrogel particles have at least one dimension of about 3 mm when dehydrated and crushed.

13. The process of recovering metal values as defined in claim 1 wherein the hydrogel is manufactured by crosslinking materials selected from the group consisting of starch, grafted starch polymer, algeric acid, algenate, natural gums, lower alkyl cellulose, hydroxyalkyl cellulose, vinyl pyrrolidone, hydroxylakyl ethyleneoxide, saccharides, xanthans, carboxyalkyl cellulose, vinyl alcohol, ethylene oxide, ethylene glycol, sulfomethylamide, peptides, ethylene carbonate, procollagen, acrylic acid, acrylate, acrylamide, and mixtures thereof.

14. The process of recovering metal values as defined in claim 1 including the further step of recycling the aqueous feedstock with additional hydrogel.

15. The process of recovering metal values as defined in claim 1 wherein the hydrogel is substantially fully hydrated when separated from the aqueous feedstock.

16. The process of recovering metal value as defined in claim 1 wherein the aqueous feedstock contains metals selected from the group consisting of free precious metals, free metal alloys of precious metals and compounds and salts containing at least one precious metal ion.

17. The process of recovering metal values as defined in claim 1 wherein the aqueous feedstock contains one or more metals, metal compounds, and metal salts selected from the group consisting of platinum, silver and gold metals and compounds and salts thereof.

18. The process of recovering metal values as defined in claim 1 wherein the aqueous feedstock contains metals selected from the group consisting of at least one of the free platinum group metals and compounds and salts containing at least one platinum group metal moiety.

19. The process of recovering metal values as defined in claim 1 wherein the aqueous feedstock contains a base metal selected from the group consisting of free base metals, their alloys and mixtures thereof, the water insoluble salts and compounds of the base metals, and the solvated simple and complex cations of the base metals.

20. The process of recovering metal values as defined in claim 1 wherein the aqueous feedstock contains one or more base metals and base metal ions selected from the group consisting of free amphoteric base metals, their alloys and mixtures thereof, the water insoluble salts and compounds of the amphoteric base metals, and the solvated simple and complex cations of the amphoteric base metals.

21. The process of recovering metal values as defined in claim 1 wherein the aqueous feedstock contains a base metal ion selected from the group consisting of anions of strong acids and water soluble alkali metals, and ammonium.

22. In the process of separating the components of an aqueous medium comprising water having material suspended or dissolved therein, the steps comprising contacting said aqueous medium with a polyacrylamide/polyacrylate hydrogel, allowing said hydrogel to expand and adsorb at least a portion of the aqueous medium, separating the hydrogel from the remaining aqueous medium, and removing water from the hydrated expanded hydrogel.

23. The process as defined in claim 22 further including the step of recovering said material from the dried hydrogel.

24. The process defined in claim 22 wherein said hydrogel is characterized by the capability of expansion in volume of 100 to 400 times its original volume upon contact with water.

25. The process defined in claim 22 wherein said hydrogel is characterized by a swelling factor of from 100 to 400.

26. The process defined in claim 22 wherein said hydrogel is characterized by a water imbibition factor of from 5 to 1000 times the weight of the hydrogel.

27. The process defined in claim 22 wherein said hydrogel comprises a crosslinked copolymer comprising about 40% by weight sodium or potassium acrylate and about 60% acrylamide crosslinked with methylene bis acrylamide.

28. The process defined claim 27 wherein said hydrogel is dried to a water content of about 8 to 13% and is crushed to a particle size of about 2 mm in each direction, and a maximum size of about 3-5 mm in one direction.

29. The process defined in claim 22 wherein said hydrogel comprises sodium acrylate crosslinked with methylene bis acrylamide.

30. The process defined in claim 29 wherein aid hydrogel has a swell factor of about 100 to about 200 in distilled water.

31. The process defined in claim 22 wherein said dissolved or suspended material is obtained from contaminated soil.

32. The process defined in claim 22 wherein the aqueous medium is contaminated water.

33. In the process of separating the components of an aqueous medium comprising water having material suspended or dissolved therein, the steps comprising contacting said aqueous medium with a polyacrylamide/polyacrylate hydrogel, allowing said hydrogel to expand and adsorb a portion of the aqueous medium, separating the hydrogel from the remaining aqueous medium, removing water from the hydrated expanded hydrogel, and recovering said material from the dried hydrogel.

34. The process defined in claim 33 wherein said hydrogel is characterized by an expansion factor of from 100 to 300 times its original volume upon contact with water.

35. The process defined in claim 34 wherein said hydrogel has a dry particle size of about 2×2×2 mm with a maximum size of 3 to 5 mm in one direction.

* * * * *